United States Patent [19]

McAbee et al.

[11] Patent Number: 5,513,612

[45] Date of Patent: May 7, 1996

[54] MULTIPLE COMBUSTION IGNITION TIMING SYSTEM

[76] Inventors: Mac P. McAbee, 1013 66th St., Des Moines, Iowa 50311; Scott G. Campbell, 2518 NE. 102nd Ave., Ankeny, Iowa 50021

[21] Appl. No.: 229,552

[22] Filed: Apr. 19, 1994

Related U.S. Application Data

[63] Continuation-in-part of Ser. No. 152,582, Nov. 15, 1993, abandoned.

[51] Int. Cl.⁶ ................................ F02P 5/145
[52] U.S. Cl. .................. 123/414; 123/418; 123/637
[58] Field of Search .................... 123/414, 418, 123/636, 637, 638

[56] References Cited

U.S. PATENT DOCUMENTS

| | | | |
|---|---|---|---|
| 1,447,745 | 3/1923 | Atkinson | 200/25 |
| 1,466,719 | 9/1923 | Howard | 123/637 |
| 1,566,888 | 12/1925 | Luckeman | 200/20 |
| 1,811,498 | 6/1931 | Geloso | 200/305 |
| 2,766,338 | 10/1956 | Jamieson et al. | 200/24 |
| 2,997,552 | 8/1961 | Silverschotz | 200/24 |
| 3,270,150 | 8/1966 | Stevens | 200/24 |
| 3,506,796 | 4/1970 | Roschilla | 200/19 A |
| 3,619,634 | 7/1970 | Burson | 123/602 |
| 3,822,686 | 7/1974 | Gallo | 123/146.5 A |
| 3,923,022 | 12/1975 | Scholl | 123/146.5 A |
| 4,121,064 | 10/1978 | Nakajima et al. | 200/19 A |
| 4,275,703 | 6/1981 | Bodig et al. | 123/617 |
| 4,315,487 | 2/1982 | Wyatt, Sr. et al. | 123/146.5 A |
| 4,378,004 | 3/1983 | Petrie | 123/643 |
| 4,406,272 | 9/1983 | Kiess et al. | 123/617 |
| 4,508,092 | 4/1985 | Kiess et al. | 123/617 |
| 4,553,427 | 11/1985 | Kuraoka et al. | 73/117.3 |
| 4,653,459 | 3/1987 | Herden | 123/636 |
| 4,658,103 | 4/1987 | McAbee et al. | 200/19 DC |
| 4,710,598 | 12/1987 | McAbee et al. | 200/21 |
| 4,951,629 | 8/1990 | McAbee et al. | 123/414 |

FOREIGN PATENT DOCUMENTS 2129491 5/1984 United Kingdom.

*Primary Examiner*—Andrew M. Dolinar
*Attorney, Agent, or Firm*—Zarley, McKee, Thomte, Voorhees & Sease

[57] ABSTRACT

The ignition system of the present invention includes electrical circuitry for firing two or more sparks during the power stroke of the engine. The sparks are fired at precise preselected degree positions of the piston, and the degree positions of the sparks can be changed from one RPM to another.

10 Claims, 3 Drawing Sheets

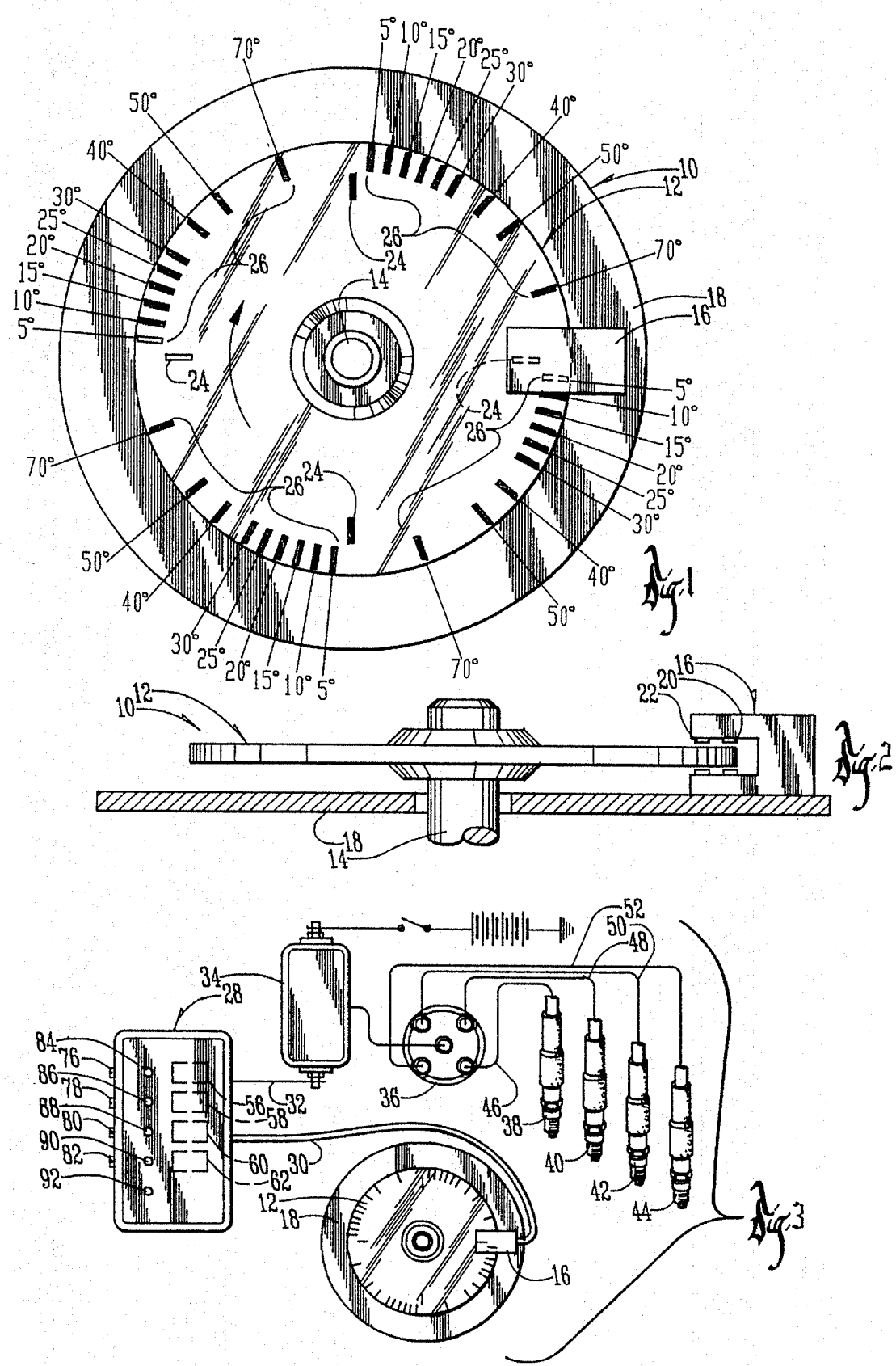

MULTIPLE COMBUSTION IGNITION TIMING SYSTEM

CROSS REFERENCE TO RELATED APPLICATIONS

This is a continuation in part of application Ser. No. 08/152,582, filed Nov. 15, 1993, now abandoned.

BACKGROUND OF THE INVENTION

This invention relates to a multiple combustion ignition system for internal combustion engines.

Currently known fuel delivery systems deliver, atomized gas vapor to the cylinder of the engine in such a manner that a single spark from an ignition system often does not completely burn all of the fuel. This is particularly true when the engine is cold or when excess fuel has been delivered to the cylinder due to imperfect fuel delivery systems, sudden acceleration, etc. Once the primary explosion occurs due to the initial spark, the air/gas mixture begins combusting near the spark plug and then spreads throughout the cylinder creating a flame front. Presently known fuel delivery systems do not provide a perfect air/gas mixture in the cylinder, and this imperfect mixture results in uneven burning as the flame front moves through out the cylinder. As a result some of the air/gas mixture often remains unburned.

Some prior art ignition systems have attempted to deal with this problem by firing a string of uncontrolled sparks in rapid progression during the power stroke of the combustion cycle. This generally does not achieve a fully satisfactory complete combustion of fuel, and also causes excessive spark plug wear.

Other prior art ignition systems have attempted to utilize a multiple ignition system which is based on the timing of the secondary explosions relative to the first explosion. The second explosion and later explosions are based upon the time lapse after the first explosion. This type of timed multiple explosion system is inadequate and is unstable because the second and later explosions will not always occur at the same position of the piston from cycle to cycle. Over a period of several cycles of the engine, the Rpm's of the engine are often inconsistent, and the secondary explosions will occur at times corresponding to different positions of the piston within the cylinder.

The effectiveness of a secondary or later explosion depends upon creating that secondary explosion precisely at the desired position of the piston in the cylinder. Such precision is not achieved when the secondary explosion is caused to occur a predetermined time after the first explosion. If the control system is not highly stable and precise the secondary explosion cannot be consistently implemented, then the advantages of having multiple sparks are significantly reduced.

Therefore a primary object of the present invention is the provision of an improved multiple combustion ignition timing system and method for operating same.

A further object of the present invention is the provision of a system and method which will generate more than one spark per compression stroke.

A further object of the present invention is the provision of an improved ignition system and method which causes the sparks to be precisely synchronized with preselected positions of the piston within the cylinder.

A further object of the present invention is the provision of an improved ignition system which has the capability of advancing primary, secondary, tertiary, or addition sparks independently of one another.

A further object of the present invention is the provision of an improved ignition timing system which permits the stepping of the spark advances according to certain preselected RPM levels.

A further object of the present invention is the provision of an improved timing system which permits the independent adjustment of the spark advance at each of the different RMP levels.

A further object of the present invention is the provision of an improved ignition timing system which permits the adjustment of the on/off ratios for the coil so as to minimize coil heating.

A further object of the present invention is the provision of an improved ignition timing system which has the ability of producing more then one spark at the time of the startup of the engine when the RPM level is between zero and a preselected RPM level.

A further object of the present invention is the provision of a highly stable ignition timing based upon the actual cylinder position rather than upon the passage of time after the first spark.

A further object of the present invention is the provision of an improved ignition timing system which utilizes an optical sensor which is highly stable.

A further object of the present invention is the provision of an improved ignition timing system which can be adapted to various types of engines, whether two cycle or four cycle, and whether single cylinder or multiple cylinder.

A further object of the present invention is the provision of an improved ignition timing system which is economical to manufacture, durable in use, and efficient in operation.

SUMMARY OF THE INVENTION

The present multiple combustion ignition timing system fires a second explosion relative to a predetermined position of the piston, rather than relative to the amount of time lapse after the first explosion as in the prior art. The system is adapted for use with an engine having a cylinder, a piston mounted within the cylinder for reciprocating movement to a plurality of degree positions therein, a cam shaft and a crank shaft connected to the piston, a spark plug connected to the cylinder, and electrical firing means connected to the spark plug for delivering a firing signal to the spark plug. The present ignition system will work equally well with engines of multiple cylinders or single cylinder engines. It will also work with ignition systems that utilize solid state spark delivery, engines that are two cycle or four cycle, and engines that utilize or do not utilize distributors.

The preferred embodiment of the present invention utilizes sensing means connected to one of the cam shaft and the crank shaft for sensing each of the degree positions of the piston and for creating a plurality of trigger signals, each of which correspond to one of the piston's degree positions. At least two firing circuits are connected to the sensing means and are each capable of producing at least two firing signals in response to at least two of the trigger signals. An RPM circuit is connected to the sensing means for receiving the trigger signals and for creating an RPM signal corresponding to the RPMs of either the cam shaft or the crank shaft. A stepping circuit is connected to the RPM circuit for receiving the RPM signal and for connecting each of the firing circuits one at a time to the firing means so as to deliver at least two separate sparks to the cylinder during the time that each firing circuit is connected to the firing means. The two sparks delivered correspond to preselected trigger signals which in turn correspond to two preselected precise positions of the piston in the cylinder. The particular firing circuit which is connected to the firing means is determined by the engine RPM level sensed by the RPM circuit. As the RPM level progresses from zero to a first preselected level, a first firing circuit is connected to the firing means. As each additional selected RPM level is achieved, a different firing circuit is connected to the firing means.

BRIEF DESCRIPTION OF THE DRAWINGS

FIG. 1 is a top plan view of the rotor which is connected either to the cam or the cam shaft of the engine.

FIG. 2 is a front elevational view thereof.

FIG. 3 is a schematic representation of the ignition system of the present invention.

DETAILED DESCRIPTION OF THE PREFERRED EMBODIMENT

Figure 4:
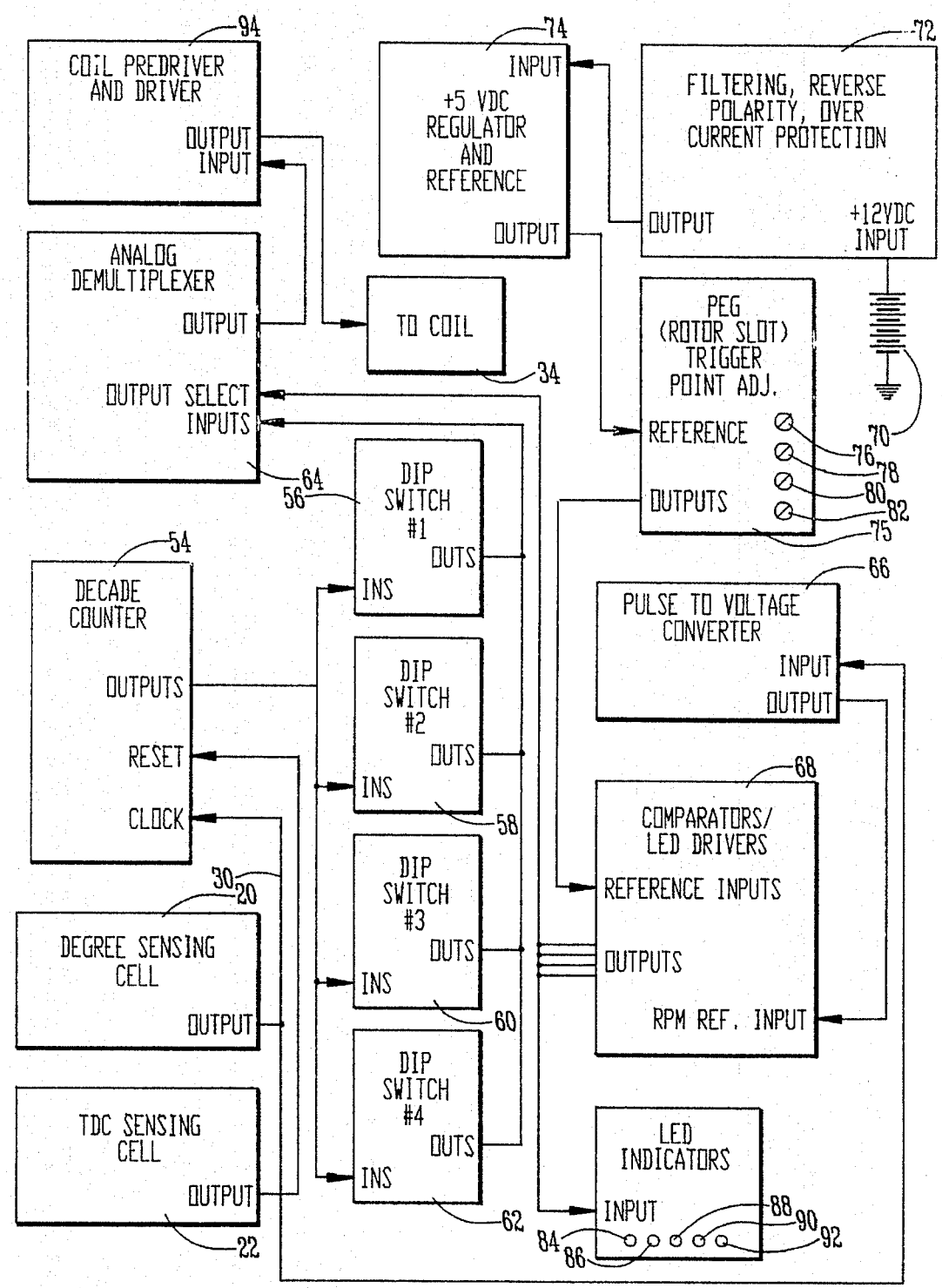
FIG. 4 is a block diagram of the various components of the ignition system of the present invention.

Referring to the drawings, the numeral 10 (FIGS. 1 and 2) refers to a sensing device for sensing the rotational position of the engine cylinder during the power stroke of the engine. Sensing device 10 includes a wheel 12 which is fixed to a rotor shaft 14. Rotor shaft may be drivingly connected either to the cam shaft of the engine or the crank shaft of the invention. In the embodiment shown in the drawings, the rotor shaft 14 is connected to a cam shaft of a four cylinder engine. The cam shaft rotates at one half the RPMs of the crank shaft. An optical sensor 16 is mounted to a stationary frame 18 and includes a degree sensing cell 20 and a top dead center (TDC) sensing cell 22. In the preferred embodiment, the sensing cells 20, 22 are optical sensors, but magnetic sensors or other types of sensors could be used as well without detracting from the invention.

The wheel 12 is made of transparent material, and includes around its outer circumference a plurality of opaque degree trigger marks 26. Located concentrically inside the trigger marks 26 are four TDC trigger marks 24. The rotation of the wheel 12 relative to the sensor 16 causes the TDC trigger marks 24 to pass adjacent the TDC sensing cell 12 and causes the degree trigger marks 26 to pass adjacent the degree sensing cell 20. The sensor 16 then sends a series of trigger signals corresponding to each of the degree trigger marks 26 and TDC trigger marks 24 through cable 30 to a control box 28 (FIG. 3). The control box 28 includes circuitry to be described below for creating a plurality of firing signals which are transmitted through connecting line 32 to ignition coil 34. The ignition coil 34 is connected through distributor 36 to four spark plugs 38, 40, 42, 44 and is capable of discharging to provide a spark to each of the spark plugs in response to the various firing signals received through line 32. The distributor 36 distributes the various sparks through distributor lines 46, 48, 50, 52 to the spark plugs 38, 40, 42, 44 respectively.

FIG. 4 is a block diagram of the circuitry which appears within control box 28. The trigger signals from the degree sensing cell 20 and the TDC sensing cell 22 are sent through cable 30 to a decade counter 54 which is adapted to count from zero to ten. As can be seen in FIG. 1 the wheel 12 rotates in a counter clockwise direction. The degree trigger marks 26 are arranged in four groups of nine. Each trigger mark 26 corresponds to a different degree position of the piston within the cylinder. While different degree positions may be chosen, the degree positions are labeled from 5° to 70° as illustrated in FIG. 1. Because the wheel 12 is directly mechanically connected through rotor shaft 14 to the cam shaft (not shown) which is driven by the piston (not shown), the degree positions represented by the marks 26 precisely represent the degree positions of the piston within the cylinder. In FIG. 1 one of the TDC markers 24 is shown being sensed by the TDC sensor cell 22. This causes the decade counter to reset to zero. The next marker to encounter the sensor, because of the clockwise rotation of wheel 12, is one of the degree sensors representing 70°. This sensor causes the decade counter to increment one count. As each additional degree trigger mark 26 encounters the sensor cell 20, the decade counter 54 is incremented an additional count until a new TDC trigger mark 24 is encountered, at which time the decade counter is reset.

The decade counter then causes the trigger signals to be passed on to four DIP switches 56, 58, 60 and 62. These DIP switches each include 10 switches which can be set in preselected combinations by the person setting up the ignition system. Each of the DIP switches includes 10 sub switches which may be put in an on or off position. Any sub switch which is put in an on position permits the trigger mark corresponding to that sub switch to pass through. Any sub switch which is set to an off position does not permit the trigger signal corresponding to that sub switch to pass through. Those trigger signals which are permitted to pass through the DIP switches 56, 58, 60, 62 are then carried to an analog demultiplexer 64.

In addition to sending the trigger signals to the decade counter 54, the degree sensing cell 20 and the TDC sensing cell 22 send those trigger signals to a pulse to voltage converter 66 which creates an RPM signal corresponding to the RPMs of the engine. This RPM signal is sent to a comparator 68 which compares the RPM signal to a plurality of preset RPM levels. These preset RPM levels are adjusted by means of four adjustable pots or RPM level adjusters 76, 78, 80, 82. These adjusters may be changed by a screwdriver to set four RPM levels at which the advance is desired to be changed. The adjusters 76, 78, 80, 82 are driven by a power source 70 which delivers power to a filtering circuit 72 which in turn delivers a power signal to the voltage regulator circuit 74. Voltage regulator circuit 74 is connected to the RPM adjusting circuit 75 containing adjusters 76, 78, 80, 82. The output from the RPM adjuster circuit 75 is connected to the comparator 68. The comparator 68 compares the RPM signal to the various levels of RPM settings coming from RPM adjustment circuit 75. When a match between the RPM signal and one of the preset RPM levels is made, a signal is sent from the comparator 68 to the analog demultiplexer 64. The analog demultiplexer 64 then matches the signal from comparator 68 to one of the four firing circuit signals coming from DIP switches 56, 58, 60, 62.

For example, if the first RPM level is from 0 to 500 RPMs, then the comparator 68 will cause the analog demultiplexer 64 to select the signal coming from DIP switch 56. That signal will then be passed on to a coil predriver circuit 94 which in turn delivers a firing signal to coil 34, causing the firing of one of the spark plugs 38, 40, 42, 44. The coil is normally in a charged condition, and the firing signal causes the coil to be turned off or discharged.

The RPM signal coming from comparator 68 also is sent to five LED indicators 84, 86, 88, 90, 92 which are visible on the outside of the control box 28. LED 84 is a static timing light. This light is used during the initial mounting of the wheel 12 and the rotor shaft 14 on to the cam shaft (not shown) the timing mark on the engine is place at top dead center, and the wheel 12 is rotated until one of the TDC markers 24 is sensed by the TDC sensor 22. This causes the static LED 84 to turn on and indicates to the operator that the wheel 12 has been properly set with respect to the rotational position of the engine. LED 86 represents the second level of RPMs set by lead screw 76. When the RPM level reaches the level set by screw 76, the LED 86 turns on indicating that the engine has achieved sufficiently high RPMs to move into the second step. At the time that the second step is achieved, the comparator 68 indicates to the analog demultiplexer 64 that only the signal from DIP switch 58 be passed through to the coil. The spark advance which has been set by setting the sub switches on DIP switch 58 thus takes over when RPM level reaches the second level. LED 88 corresponds to the setting made by set screw 78, and when turned on, causes the demultiplexer 64 to pass through only the trigger signals coming from DIP switch 60. LED 90 represents a fourth RPM level set by set screw 80. When this level is achieved the trigger signals from DIP switch 62 are permitted to pass through.

LED 92 comes on only when the engine achieves a preset maximum RPM level beyond which it is unsafe to operate the engine. When this occurs the coil 34 is disabled by a spark disable circuit designated 96 in FIG. 5. The rev limit RPM level may be set by set screw 82.

Figure 5:
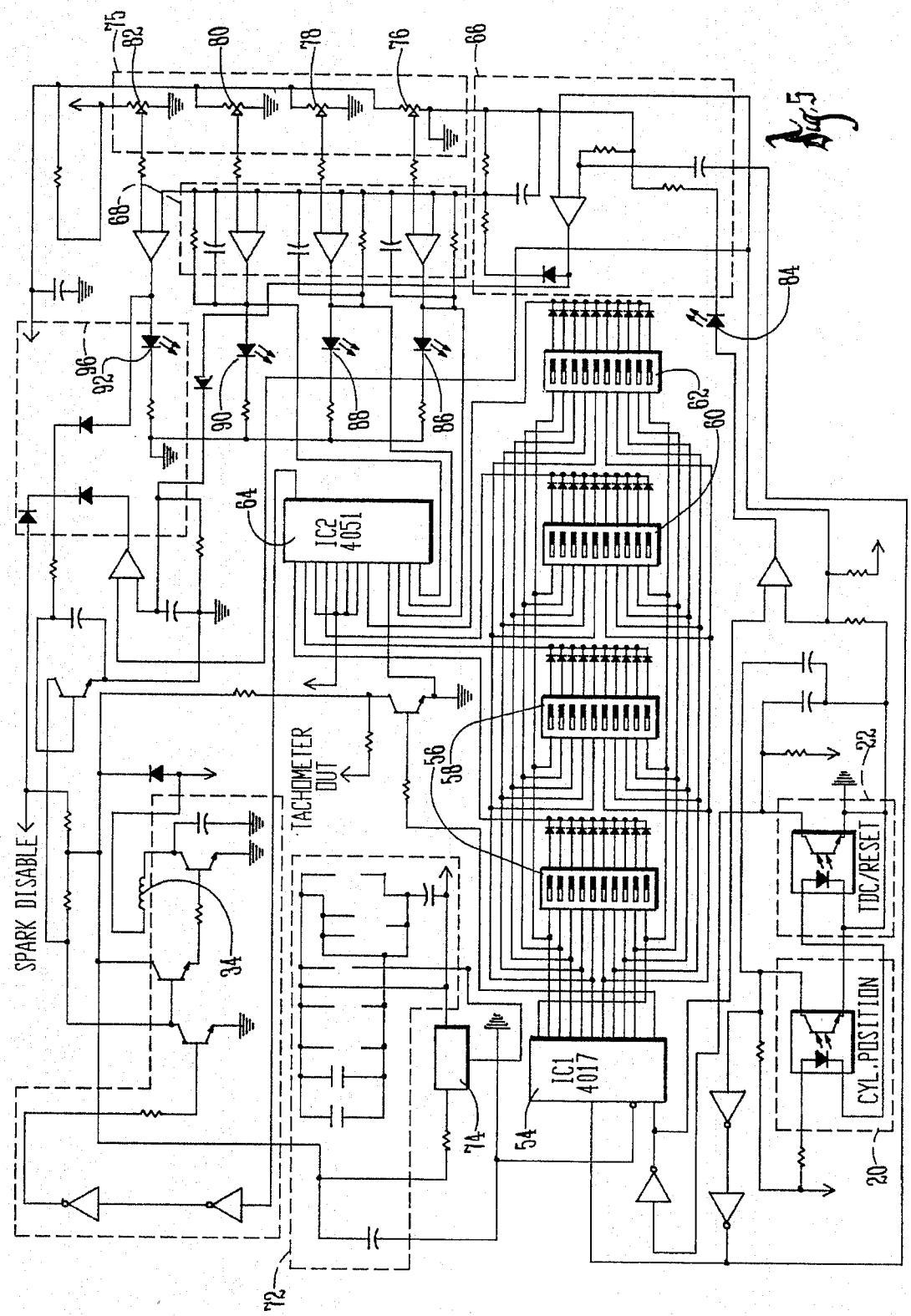
FIG. 5 is an electrical schematic of the components shown in the block diagram in FIG. 4.

Referring to FIG. 5, the various blocks in the block diagram of FIG. 4 are shown in shadow lines in FIG. 5.

Below is a table showing an example for the setting for the four DIP switches 56, 58, 60, 62.

TABLE ONE

| Sub Switch | On/Off | Fire | Charge | Dormant |
|---|---|---|---|---|
| DIP Switch 56 0 to 1,000 RPM Fire at 20° and 5° | | | | |
| 10 | 70° | Off | | X |
| 9 | 50° | Off | | X |
| 8 | 40° | Off | | X |
| 7 | 30° | Off | | X |
| 6 | 25° | On | X | |
| 5 | 20° | Off | X | |
| 4 | 15° | Off | | X |
| 3 | 10° | On | X | |
| 2 | 5° | Off | X | |
| 1 | 0° | Off | | X |
| DIP Switch 58 1,000 to 2,500 RPM Fire at 30° and 10° | | | | |
| 10 | 70° | Off | | X |
| 9 | 50° | On | X | |
| 8 | 40° | On | X | |
| 7 | 30° | Off | X | |
| 6 | 25° | Off | | X |
| 5 | 20° | On | X | |
| 4 | 15° | On | X | |
| 3 | 10° | Off | X | |
| 2 | 5° | Off | | X |
| 1 | 0° | Off | | X |

TABLE ONE-continued

| Sub Switch | On/Off | Fire | Charge | Dormant |
|---|---|---|---|---|
| DIP Switch 60 2,500 to 3,500 RPM Fire at 40° and 20° | | | | |
| 10 | 70° | On | | X |
| 9 | 50° | On | | X |
| 8 | 40° | Off | X | |
| 7 | 30° | On | | X |
| 6 | 25° | On | | X |
| 5 | 20° | Off | X | |
| 4 | 15° | On | X | |
| 3 | 10° | On | X | |
| 2 | 5° | On | X | |
| 1 | 0° | On | | X |
| DIP Switch 62 3,500 to 5,000 RPM Fire at 15° and 30° | | | | |
| 10 | 70° | On | | X |
| 9 | 50° | On | | X |
| 8 | 40° | On | | X |
| 7 | 30° | Off | X | |
| 6 | 25° | On | | X |
| 5 | 20° | On | | X |
| 4 | 15° | Off | X | |
| 3 | 10° | On | | X |
| 2 | 5° | On | | X |
| 1 | 0° | On | | X |

The four RPM settings are for 0 to 1,000 RPMs; 1,000 to 2,500 RPMs; 2,500 to 3,500 RPMs; and 3,500 to 5,000. The set screw 76 is set at 1,000 RPMs to provide a dividing line between the first step and the second step. The set screw 78 is set to 2,500 RPMs to provide a dividing line between the second step and the third step. The set screw 80 is set at 3,500 RPMs to provide a dividing line between the third step and the fourth step. The set screw 82 is set to 5,000 RPMs so as to cause the spark to be disabled whenever the RPMs exceed 5,000.

The DIP switch 56 is set to permit firing at a piston position of 20° and 5° in advance of top dead center. In this setting all of the sub switches of DIP switch 56 are set to an off position except for the switch number 6 and the switch number 3. As the wheel 12 rotates toward the sensor 16, the sensor first encounters the 70° trigger mark. The sensor progressively senses the 50°, 40° and 30° marks. Because the sub switches of DIP switch 56 are off in these positions, the coil remains dormant. When the sensor reaches the 6th sub switch it encounters an on switch which causes the coil to be charged preparatory to firing. When the sensor reaches sub switch number 5 (corresponding to 20°) it encounters an off switch which causes the coil to discharge and fire. Again when the sensor encounters switch number 3 it permits the coil to be turned on and when the sensor encounters sub switch 2 it permits the coil to be discharged and fired.

It should be noted that all of the sub switches of DIP switch 56 are set to an off position except for the ones immediately preceding the degree trigger mark required for firing. This minimizes the time that the coil is saturated, thereby preventing the coil from becoming overheated at low RPMs or during a cold start.

DIP switch 58 is set with all of the sub switches in an off position except for the two sub switches immediately preceding the 30° trigger mark and the two sub switches immediately preceding the 10° mark. Because of the higher RPMs, it is desirable to have two switches on before encountering the firing switch so as to give the coil sufficient to saturate.

DIP switch 60 is set with all of the sub switches in an on position except for the two sub switches corresponding to 40° and 20°. Thus the coil is charging at all times except during the two degree positions where it fires. The reason for this setting is because of the high RPMs of the engine thereby necessitating further advance charging of the coil so that it will be fully charged at the time of firing.

DIP switch 62 controls whenever the RPMs are between 3,500 and 5,000 RPMs. In this mode, only the switches at the 30° position and the 15° position are turned off and all other switches are turned on.

From the above it can be seen that each of the various RPM levels can be set to whatever is desired, and that the degree of firing can be precisely set at any RPM level. Furthermore, the firing occurs precisely at the degree position of the piston rather than operating on a timing principle such as occurs in prior devices. While the above example shows only two sparks being fired at each level, it is possible to set as many as five sparks during the power stroke utilizing the circuitry of the present invention.

The present invention is particularly advantageous during engine cold starts. During the normal cold starting of an engine the fuel is seldom completely burned. However, by providing two or more sparks during the power stroke, a far more thorough consumption of the fuel can be accomplished. Also, because of the additional sparks the engine will usually warm up quicker than is the case with a single spark. The four DIP switches 56, 58, 60, 62 may be independently set to whatever degree advance is desired. Furthermore, a different number of sparks can be set for each of the four DIP switches because the four DIP switches are totally independent of one another.

Another valuable feature of the present invention is the ability to keep the coil in an off condition during those portions of the cycle when it is not required to be charged. This will extend the coil life, and prevent overheating of the coil.

The system is extremely stable because the ignition timing is based on actual cylinder position and is not based on time calculations. While an optical sensing system is shown, other types of sensing systems could be utilized including magnetic systems or other systems having markers representing each of the cylinder degree positions.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A multiple combustion ignition timing system for an internal combustion engine having a cylinder, a piston mounted within said cylinder for reciprocating movement to a plurality of degree positions therein, a cam shaft and a crank shaft connected to said piston for rotation in response to reciprocating movement of said piston, and electrical firing means for delivering a spark to said cylinder, said system comprising:

sensing means connected to one of said cam shaft and said crank shaft for sensing each of said degree positions of said piston and for creating a plurality of trigger signals, each of which corresponds to one of said degree positions;

a first firing circuit connected to said sensing means and being capable of creating at least a first firing signal and a separate second firing signal in response to receiving said plurality of trigger signals, said first and second firing signals, each corresponding to first and second preselected ones of said trigger signals;

said first firing circuit being connectable to said firing means for causing said first and second firing signals to be delivered to said firing means whereby said firing means will deliver first and second separate sparks to said cylinder;

a second firing circuit connected to said sensing means and being capable of creating a third and a fourth firing signal in response to receiving said plurality of trigger signals;

an RPM circuit connected to said sensing means for receiving said trigger signals and creating an RPM signal corresponding to the RPMs of said one of cam shaft and said crank shaft;

a stepping circuit connected to said RPM circuit for receiving said RPM signal and for connecting said first firing circuit to said firing means when the RPMs of said one of said cam shaft and said crank shaft are between zero and a first preselected RPM level, said stepping circuit connecting said second firing circuit to said firing means when the RPMs of said one of said cam shaft and said crank shaft are above said first RPM level and below a second higher preselected RPM level.

2. A system according to claim 1 wherein said sensing means comprises a rotatable member driven rotatably by said one of said cam shaft and said crank shaft for rotation in unison therewith; trigger members mounted in spaced relation to one another on said rotatable member, and a stationary trigger sensor for sensing said trigger members one at a time during rotation of said rotatable member.

3. A system according to claim 2 wherein said rotatable member is transparent and said trigger members each comprise an opaque mark on said rotatable member.

4. A system according to claim 1 and further comprising a plurality of additional firing circuits each being connectable to said firing means for causing at least two firing signals to be delivered to said firing means, said stepping circuit being adapted to connect said additional firing circuits one at a time to said firing means when said RPMs of said one of said cam shaft and said crank shaft are rotating at additional preselected RPM levels respectively.

5. A system according to claim 1 wherein each of said first and second firing circuits are independently selectively adjustable to change each of said first and second firing signals and said third and fourth firing signals respectively to correspond to different ones of said trigger signals.

6. A system according to claim 5 wherein each of said first and second firing circuits are independently selectively adjustable to create additional firing signals in addition to said first and second firing signals and said third and fourth firing signals respectively.

7. A system according to claim 1 wherein said stepping circuit is adjustable to permit selective adjustment of said first and second RPM levels.

8. A system according to claim 1 wherein said firing means includes at least one coil, said first and second firing circuits being capable of causing the charging of said coil during at least a portion of the time between said first, second, third, and fourth firing signals and being capable of causing discharge of said coil in response to any one of said first, second, third, and fourth firing signals.

9. A system according to claim 8 wherein said first and second firing circuits each include adjustment means for adjusting the length of time that said coils are charged between said first, second, third, and fourth firing signals.

10. A multiple combustion ignition timing system for an internal combustion engine having a cylinder, a piston mounted in said cylinder for reciprocating movement therein to a plurality of degree positions within said cylinder, electrical firing means for delivering a spark to said cylinder, a cam shaft and a crank shaft connected to said piston and being adapted to rotate in response to reciprocating motion of said piston, said multiple ignition timing system comprising:

sensing means connected to one of said crank shaft and said cam shaft for sensing each of said degree positions of said piston and for creating a plurality of trigger signals, each of which correspond to one of said degree positions;

a plurality of firing circuits connected to said sensing means, each of said firing circuits being capable of producing at least two firing signals in response to at least two of said trigger signals;

RPM circuitry connected to said sensing means for receiving said trigger signals and for producing an RPM signal corresponding to the RPMs of said one of said cam shaft and said crank shaft;

stepping circuitry connected to said RPM circuitry for receiving said RPM signal;

said stepping circuitry connecting one of said firing circuits to said firing means when said RPM signal corresponds to from zero RPMs to a first preselected RPM;

said stepping circuitry connecting other of said firing circuits to said firing means when said RPM signal corresponds to other preselected RPMs.

* * * * *